Dec. 30, 1941.  W. MEYER  2,268,456
SELF-LOCKING HOSE OR SIMILAR COUPLING
Filed June 15, 1940

INVENTOR.
William Meyer,
BY George D. Richards
ATTORNEY.

Patented Dec. 30, 1941

2,268,456

UNITED STATES PATENT OFFICE 2,268,456

SELF-LOCKING HOSE OR SIMILAR COUPLING

William Meyer, East Orange, N. J., assignor to A. W. Wheaton Brass Works, Newark, N. J., a corporation of New Jersey Application June 15, 1940, Serial No. 340,632

6 Claims. (Cl. 285—173)

This invention relates to improvements in manually releasable self-locking hose and similar couplings.

This invention has for an object to provide a coupling structure including novel automatic and quick-acting means for securing interengaged male and female elements thereof against separation, but nevertheless subject, by simple manipulation, to be easily and quickly released when separation of said male and female elements is desired.

This invention has for another object to provide a novel self-locking hose or like coupling wherein the locking element comprises a spring canted clutch-ring to receive and automatically grip the male element of the coupling when inserted in the female element thereof; novel means being provided for supporting said clutch-ring in operative assembled relation to said female element in such manner that it is free to turn therein and consequently, when the inserted male element is gripped thereby, said male element can neither be displaced from operative engaged relation to said female element or unseated from its sealing gasket by either attempted pulling or twisting manipulation or movement of said male element.

Another object of this invention is to provide a simple means for manually actuating the clutch-ring when release thereof is desired; such means being so located within and relative to a protecting wall of the female element of the coupling structure as to be substantially shielded from accidental contact or manipulation.

Other objects of this invention, not at this time more particularly enumerated, will be understood from the following detailed description of the same.

An illustrative embodiment of a coupling structure according to this invention is shown in the accompanying drawing, in which—

Figure 1:
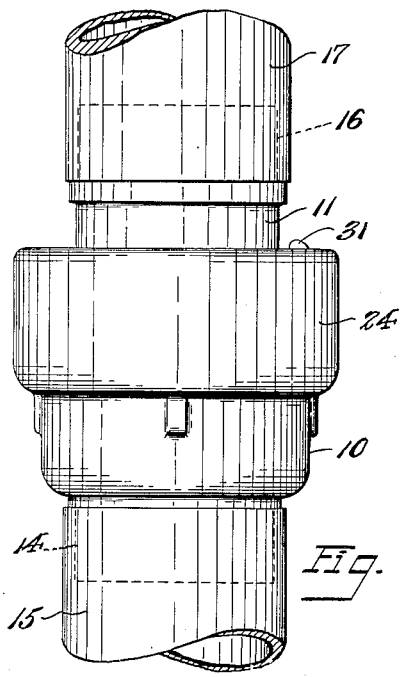
Figure 2:
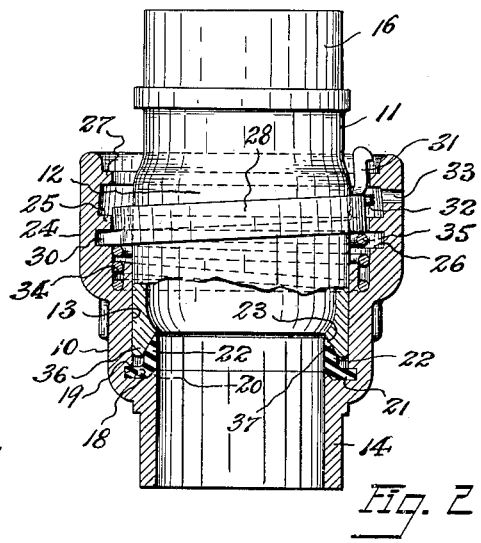
Figure 3:
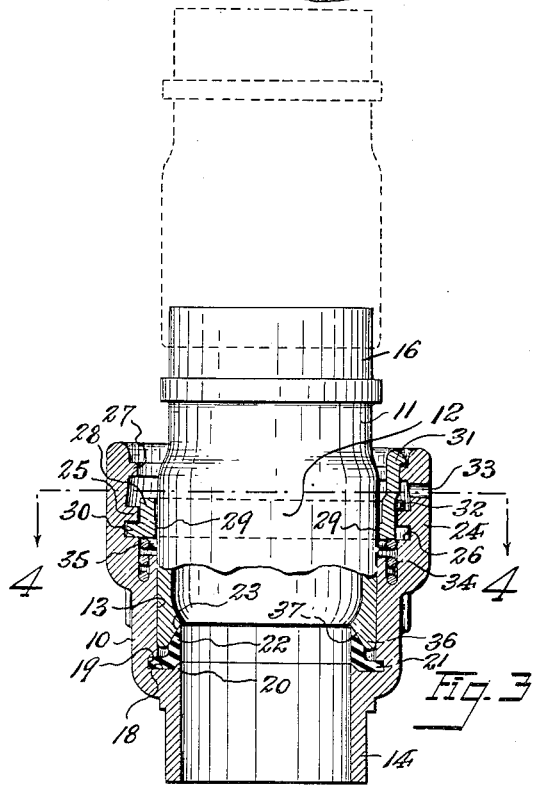
Figure 4:
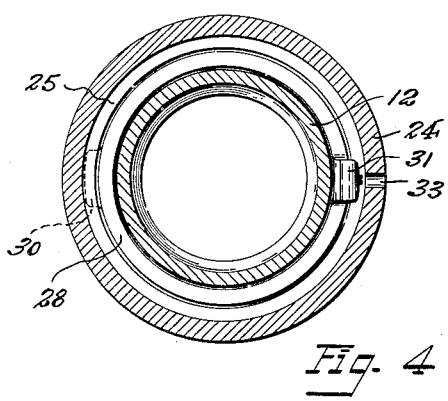

Fig. 1 is a side elevational view of the coupling structure, with the male and female elements thereof operatively engaged; Fig. 2 is a longitudinal sectional view of the coupling structure, with the clutch-ring and portions of the male element thereof shown in elevation, said clutch-ring being disposed in operative gripping relation to said male element; Fig. 3 is a view similar to that of Fig. 2, but showing the clutch-ring in section and also depressed to male element releasing position; and Fig. 4 is a horizontal sectional view, taken on line 4—4 in Fig. 3.

Similar characters of reference are employed in the above described views, to indicate corresponding parts.

The illustrative embodiment of the invention shown in the accompanying drawing is that of a hose coupling structure, which comprises a female element 10 and a male element 11, the latter terminating in a coupler section 12 of somewhat enlarged diameter which is sized to slidably enter and fit within a socket section 13 with which the female element is provided.

Below its socket section 13, said female element 10 terminates in a tubular neck-portion 14, over which the end portion 15 of a hose section or the like may be engaged and secured in any desired manner familiar to the art. Similarly, said male element 11 terminates at its upper end in a tubular neck-portion 16, over which the end portion 17 of another hose section or the like may be engaged and secured in suitable manner.

Provided in the female element intermediate its socket section 13 and its tubular neck-portion 14 is sealing gasket seat 18. This sealing gasket seat 18 terminates at its outward periphery in an annular anchorage channel 19 which is formed in the wall of said socket section 13. The sealing gasket seat 18 terminates at its inward periphery at an upstanding annular keeper shoulder 20 which surroundingly bounds the passage of the tubular neck-portion 14. Engaged on the seat 18 is the base portion 21 of an upstanding annular sealing gasket 22. The outer marginal part of said base portion 21 is entered in the anchorage channel 19, thus holding the sealing gasket structure against displacement, while the inner peripheral part of said base portion 21 conforms to and abuts the keeper shoulder 20, thus further supporting and holding the sealing gasket against displacement. The upstanding sealing gasket 22, as supported by its thus retained base portion 21 is disposed in spaced relation to the internal wall surfaces of the socket section 13 of the female element. At its upper free peripheral portion, said upstanding sealing gasket 22 terminates in an externally chamfered or tapered lip portion 23.

Above its socket section 13, said female element 10 terminates in a diametrically enlarged, upwardly open housing section 24. Formed in connection with the walls of said housing section 24 is a lower internal annular keeper flange 25 which is spaced above the floor 26 of the housing section chamber. Also formed in connection with the walls of said housing section 24 is an upper internal annular keeper flange 27 which is spaced above said lower keeper flange 25.

Located within the housing section chamber is the clutch-ring 28 of the device, the same having an internal annular gripper portion 29. Externally projecting from one side of said clutch-ring 28 is a fulcruming lug or ear 30. This lug or ear 30, when the clutch ring is operatively assembled within the housing section 24 is engaged beneath the lower keeper flange 25, whereby the same is fulcrumed for operative canting movement. Upwardly projecting from the opposite side of said clutch-ring 28 is an upstanding finger piece 31, the same being preferably somewhat outwardly offset from the outer periphery of the clutch-ring. This finger piece 31 extends upwardly through the housing section chamber between the wall thereof and the side of the inserted male element 11, with its free end portion accessibly disposed at the upper open mouth of said housing section chamber. After the clutch-ring 28 is operatively assembled, an external stop screw or stud 32 is affixed to the side thereof at a point substantially in line with the finger piece location, the same being adapted to abut the underside of the upper keeper flange 27, when the male element 11 is withdrawn, whereby to prevent displacement of the clutch-ring 28 from its operative assembled relation to the housing section 24. Provided in the wall of said housing section 24 is a through opening 33, through which said stop screw or stud 32 may be passed when affixing the same to the clutch-ring.

Countersunk in the lower portion of said housing section 24 is an annular seating socket 34 which is upwardly open through the floor 26 of said housing section chamber. Seated in said seating socket 34 is the lower end portion of a spiral compression spring member 35, the upper end of which thrusts against the underside of the clutch-ring 28 so as to yieldably exert canting pressure thereupon.

The coupler section 12 of the male element 11 terminates at its free end in a nosing 36 having an internal annular chamfered face 37 to match and engage the lip portion 23 of the sealing gasket 22.

To couple the male element 11 to the female element 10, the coupler section 12 of the former is axially aligned with the female element in opposition to the open end of the housing section 24 thereof, and is thereupon thrust into the said female element. As the coupler section 12 enters through the housing section chamber it will encounter the clutch-ring 28 so as to enter through the opening thereof. The inward pressure exerted upon the clutch-ring 28 by the entering coupler section 12 operates to swing down the clutch-ring against the thrust of the spring member 35, whereby the opening of said clutch-ring is brought into squared axial alignment with the coupler section 12, thus permitting the latter to pass downwardly through the clutch-ring without resistance. As the coupler section 12 continues its entering movement, the same will enter the socket section 13 of the female element 10 until its nosing 36 encounters the sealing ring 22, against the lip portion 23 of which the internal chamfered face 37 of said nosing 36 is firmly pressed. As the coupling section 12 comes to rest, the upward thrust of the spring member 35 swings upward the clutch-ring 28 so as to cant the same in binding or gripping relation to the coupling section thereby firmly holding the same against withdrawal from tight sealing engagement with said sealing gasket (see Fig. 2). The lip portion 23 of the sealing gasket 22 being internally related to the end of said coupling section, pressure of fluid passing through the coupling also tends to firmly press said lip portion home against the chamfered face 37 of the coupling section nosing 36, whereby to further assure a tightly sealed joint between the male and female elements of the coupling structure.

Owing to the provision of the annular keeper flange 25 beneath which the fulcruming lug or ear 30 of the clutch-ring 28 is engaged, so as to be fulcrumed for canting or tilting movement, any attempt to work loose the coupling section 12 by twisting motion thereof will fail, since the clutch-ring 28 will merely rotate relative to the housing section 24 without in any way loosening or relaxing the grip of said clutch-ring 28 upon the coupling section 12 of the male element. This is of great importance since it cures a defect which has been heretofore characteristic of clutch-ring type couplings. The provision of the upper annular keeper flange 27 also assures proper cooperation with the stop screw or stud 32 when the male element is withdrawn from the female element, no matter to what rotatively shifted position the clutch-ring may at any time happen to be disposed.

When it is desired to release and uncouple the male element 11 from the female element 10, the operator merely presses downwardly upon the finger piece 31 to depress the clutch-ring 28 to squared axial alignment with the coupler section 12 (see Fig. 3), thus relaxing the grip of said clutch-ring 28 upon the coupler section 12, whereafter the latter may be easily pulled out through the former so as to detach the male element from the female element. Either abutment of the stop screw or stud 32 on the floor 26 of said housing section 24, or abutment of a stop shoulder 38 (with which the finger piece 31 may be provided) against the upper side of the upper annular keeper flange 27 may optionally be employed to limit the downswung movement of the clutch-ring 28 to released relation to the coupler section 12 of the male element.

It will be observed that when the male element is entered in and secured to the female element by the grip of the clutch-ring 28, as shown in Fig. 2, the finger piece 31 of the latter is well guarded or protected by the surrounding wall of the housing section 24 so as to be little likely to be struck or otherwise accidentally engaged with risk of undesired releasing effect upon the clutch-ring, thus assuring the integrity of the operative coupled relation of the male and female elements in use.

Having described my invention, I claim:

1. A self-sealing coupling device comprising, a female element having a socket section and a diametrically enlarged outwardly open housing section extending from said socket section, said housing section having axially spaced internal annular keeper flanges projecting from the walls thereof, a clutch-ring within said housing section, said clutch-ring having a fulcrum lug externally projecting from one side thereof to engage beneath the lower keeper flange, whereby to pivot the clutch-ring while nevertheless leaving the same free to rotate relative to said housing section said clutch-ring having on its opposite side an externally projecting stop means engageable with the upper keeper flange to limit canting movement of said clutch-ring, a male element having a coupler section adapted to be entered through said housing section and its contained clutch-ring to fittingly engage in said socket section, said socket section having a sealing gasket affixed therein to be engaged by the entered coupler section, a helical compression spring to yieldably bear against the underside of said clutch-ring whereby the same is canted into gripping relation to the inserted coupler section, and an upstanding finger piece connected with said clutch-ring having its free end exposed at the open end of said housing section subject to manual engagement whereby said clutch-ring may be depressed for release of its normal holding grip upon said coupler section.

2. A self-sealing coupling device comprising, a female element having a socket section and a diametrically enlarged outwardly open housing section extending from said socket section, said housing section having axially spaced internal annular keeper flanges projecting from the walls thereof, a clutch-ring within said housing section, said clutch-ring having a fulcrum lug externally projecting from one side thereof to engage beneath the lower keeper flange, whereby to pivot the clutch-ring while nevertheless leaving the same free to rotate relative to said housing section, said clutch-ring having on its opposite side an externally projecting stop means engageable with the upper keeper flange to limit canting movement of said clutch-ring, a male element having a coupler section adapted to be entered through said housing section and its contained clutch-ring to fittingly engage in said socket section, said socket section having a sealing gasket affixed therein to be engaged by the entered coupler section, a helical compression spring to yieldably bear against the underside of said clutch ring whereby the same is canted into gripping relation to the inserted coupler section, an upstanding finger piece connected with said clutch-ring having its free end exposed at the open end of said housing section subject to manual engagement whereby said clutch-ring may be depressed for release of its normal holding grip upon said coupler section, and means to limit the depressing movement of said clutch-ring.

3. A self-sealing coupling device comprising, a female element having a socket section and a diametrically enlarged outwardly open housing section extending from said socket section, said housing section having axially spaced internal annular keeper flanges projecting from the walls thereof, a clutch-ring within said housing section, said clutch-ring having a fulcrum lug externally projecting from one side thereof to engage beneath the lower keeper flange, whereby to pivot the clutch-ring while nevertheless leaving the same free to rotate relative to said housing section, said clutch-ring having on its opposite side an externally projecting stop means engageable with the upper keeper flange to limit canting movement of said clutch-ring, a male element having a coupler section adapted to be entered through said housing section and its contained clutch-ring to fittingly engage in said socket section, said socket section having a sealing gasket affixed therein to be engaged by the entered coupler section, spring means to yieldably bear against the underside of said clutch-ring whereby the same is canted into gripping relation to the inserted coupler section, means for manually depressing said clutch-ring to release its grip upon said coupler section and means to limit the depressing movement of said clutch-ring.

4. A coupling device comprising, a female element having an endwise open housing section provided with axially spaced internal annular keeper flanges, a tiltable clutch-ring rotatably mounted and enclosed within said housing section, said clutch-ring having at one side an external lug engaged beneath the lower keeper flange to fulcrum the tilting action thereof and at its opposite side an external stop means cooperative with the upper keeper flange to limit such tilting action, a male element adapted to be entered in said housing section and through said clutch-ring so as to be frictionally gripped at diametrically opposite points by the latter and thus secured against retractive movement, and spring means to tilt said clutch-ring into such gripping relation to the inserted male element.

5. A coupling device comprising, a female element having an endwise open housing section provided with axially spaced internal annular keeper flanges, a tiltable clutch-ring rotatably mounted and enclosed within said housing section, said clutch-ring having at one side an external lug engaged beneath the lower keeper flange to fulcrum the tilting action thereof and at its opposite side an external stop means cooperative with the upper keeper flange to limit such tilting action, a male element adapted to be entered in said housing section and through said clutch-ring so as to be frictionally gripped at diametrically opposite points by the latter and thus secured against retractive movement, an annular compression spring beneath said clutch-ring to thrustingly tilt the same into such gripping relation to the inserted male element, said female element having an annular seating socket to support said spring, and means for manually depressing the spring tilted clutch-ring to release its grip upon the inserted male element to permit withdrawal of the latter from said female element.

6. A self-sealing coupling device comprising, a female element having an annular internal socket section and a diametrically enlarged endwise open housing section extending outwardly beyond said socket section, said housing section having axially spaced internal annular keeper flanges, a tiltable clutch-ring rotatably mounted and enclosed within said housing section, said clutch-ring having at one side an external lug engaged beneath the lower keeper flange to fulcrum the tilting action thereof and at its opposite side an external stop means cooperative with the upper keeper flange to limit such tilting action, a male element adapted to be entered in said housing section and through said clutch-ring so as to be frictionally gripped at diametrically opposite points by the latter and thus secured against retractive movement, spring means to tilt said clutch-ring into such gripping relation to the inserted male element, and said socket section having an annular sealing gasket affixed therein adapted to be compressively engaged by the inserted and clutch-ring secured male element.

WILLIAM MEYER.